United States Patent [19]

Kawamura

[11] Patent Number: 5,574,574
[45] Date of Patent: Nov. 12, 1996

[54] METHOD OF DISPLAYING THE SAME INFORMATION ON A PLURALITY OF IMAGE DISPLAY APPARATUSES

[75] Inventor: Koichi Kawamura, Kunitachi, Japan

[73] Assignee: Canon Kabushiki Kaisha, Tokyo, Japan

[21] Appl. No.: 437,633

[22] Filed: May 9, 1995

Related U.S. Application Data

[63] Continuation of Ser. No. 894,583, Jun. 5, 1992, abandoned.

[30] Foreign Application Priority Data

Jul. 11, 1991 [JP] Japan ........................... 3-171288

[51] Int. Cl.$^6$ ............................ H04Q 11/04; H04N 1/00; G09G 3/00
[52] U.S. Cl. .................... 358/468; 358/443; 370/62
[58] Field of Search ........................ 358/468, 257, 358/263, 402, 438, 452; 359/135, 124, 152, 154, 174; 370/4, 29, 80, 94, 85, 12, 85.6, 85.7, 85.15, 103; 455/612, 608, 606, 619, 601, 602; 379/94, 91, 96, 100, 102, 211; 380/2, 48, 20; 375/36, 121

[56] References Cited

U.S. PATENT DOCUMENTS

| | | | |
|---|---|---|---|
| 4,450,554 | 5/1984 | Steensma et al. | 370/4 |
| 4,759,053 | 7/1988 | Satomi et al. | 379/100 |
| 4,781,427 | 11/1988 | Husbands et al. | 350/96.16 |
| 4,918,723 | 4/1990 | Iggulden et al. | 379/100 |
| 4,953,159 | 8/1990 | Hayden et al. | 370/62 |
| 4,974,173 | 11/1990 | Stefik et al. | 364/521 |
| 4,977,593 | 12/1990 | Ballance | 380/2 |
| 4,983,010 | 1/1991 | Popp | 350/96.2 |
| 4,996,707 | 2/1991 | O'Malley et al. | 379/100 |
| 5,002,491 | 3/1991 | Abrahamson et al. | 434/322 |
| 5,040,242 | 8/1991 | Tsuchiya et al. | 359/154 |
| 5,048,076 | 9/1991 | Maurer et al. | 379/94 |
| 5,050,164 | 9/1991 | Chao et al. | 359/135 |
| 5,063,595 | 11/1991 | Ballance | 380/48 |
| 5,079,763 | 1/1992 | Chao et al. | 370/85.6 |
| 5,088,112 | 2/1992 | Pyhalammi et al. | 375/36 |
| 5,095,450 | 3/1992 | Shakra et al. | 395/114 |
| 5,107,443 | 4/1992 | Smith et al. | 395/158 |
| 5,111,451 | 5/1992 | Piasecki et al. | 370/29 |
| 5,185,738 | 2/1993 | Kelly | 379/269 |
| 5,226,120 | 7/1993 | Brown et al. | 395/200 |

*Primary Examiner*—Paul Ip
*Attorney, Agent, or Firm*—Fitzpatrick, Cella, Harper & Scinto

[57] ABSTRACT

In a method of displaying the same information on a plurality of display apparatuses, a first display apparatus provided with a facsimile reception function is connected to a second display apparatus using a line different from a telephone line for facsimile reception. Received information is displayed on the first display apparatus and is transmitted to the second display apparatus via the different line. The same information as the received information is displayed on the second display apparatus substantially simultaneously with the first display apparatus.

8 Claims, 3 Drawing Sheets

METHOD OF DISPLAYING THE SAME INFORMATION ON A PLURALITY OF IMAGE DISPLAY APPARATUSES

This application is a continuation of application Ser. No. 07/894,583 filed Jun. 5, 1992. Now abandoned.

BACKGROUND OF THE INVENTION

1. Field of the Invention

This invention relates to a display method in a plurality of display apparatuses which perform display operations linked with a facsimile apparatus.

2. Description of the Related Art

There have been display apparatuses in which an image is formed on a recording medium and the image formed on the recording medium is displayed on a window for display. Since such display apparatuses consume little electric power during display and can display a large-sized image, they have been used as electronic bulletin boards.

Display apparatuses provided with a communication function in which the above-described display apparatus is provided with a facsimile function so as to display an image transmitted from a remote location have been disclosed, for example, in U.S. patent application Ser. Nos. 438,009 and 811,054, filed Nov. 20, 1989 and Dec. 20, 1991, respectively.

When the same contents are displayed on a plurality of such display apparatuses provided with a communication function installed in a location, it is necessary to transmit repeatedly the same image from a facsimile apparatus of an image transmitter, whereby the time of use of a telephone line is increased.

The respective display apparatuses sequentially receive the image. Hence, if a plurality of display apparatuses are present within the field of view of an observer, images on the respective display apparatuses successively change, whereby the observer is distracted by the plurality of display apparatuses.

Furthermore, since each display apparatus must be provided with a facsimile function, the entire unit becomes expensive.

SUMMARY OF THE INVENTION

It is an object of the present invention to provide an image display method in which the above-described disadvantages are removed.

It is a further object of the present invention to provide an image display method which can display the same image on a plurality of display apparatuses with a relatively inexpensive configuration.

It is a still further object of the present invention to provide an image display method which can display the same image or different images on a plurality of display apparatuses in a short time.

It is still another object of the present invention to provide an image display method which can display the same image or different images on a plurality of display apparatuses while shortening the time of use of a telephone line by a facsimile apparatus of an image transmitter.

In accordance with an embodiment of the present invention, an image transmitted via a telephone line from a facsimile apparatus of an image transmitter is first received by a host display apparatus provided with a facsimile function, and the received image is simultaneously transmitted to satellite display apparatuses each provided with an optical modem using inexpensive optical cables.

The foregoing and other objects, advantages and features of the present invention will become more apparent from the following description taken in connection with the accompanying drawings and the appended claims.

DETAILED DESCRIPTION OF THE PREFERRED EMBODIMENT

A preferred embodiment of the present invention will now be explained in detail with reference to the drawings.

An apparatus of the present embodiment includes display units which adopt a magnetic-stylus display method. Image information transmitted from a facsimile apparatus of an image information transmitter via a telephone line is first received by and displayed on a host display apparatus provided with a facsimile function, and the received image information is transmitted to satellite or branch display apparatuses each including an optical modem using inexpensive optical cables.

In transmitting display information (image information) from the host display apparatus, the satellite display apparatuses can be connected in series, and the display information can be simultaneously relayed from the host display apparatus or a satellite display apparatus in the preceding stage to a satellite display apparatus in the following stage and further to a satellite display apparatus in the next stage. When the host display apparatus displays the entirety of one picture frame, the satellite display units simultaneously display the entirety of the picture frame.

Figure 1:
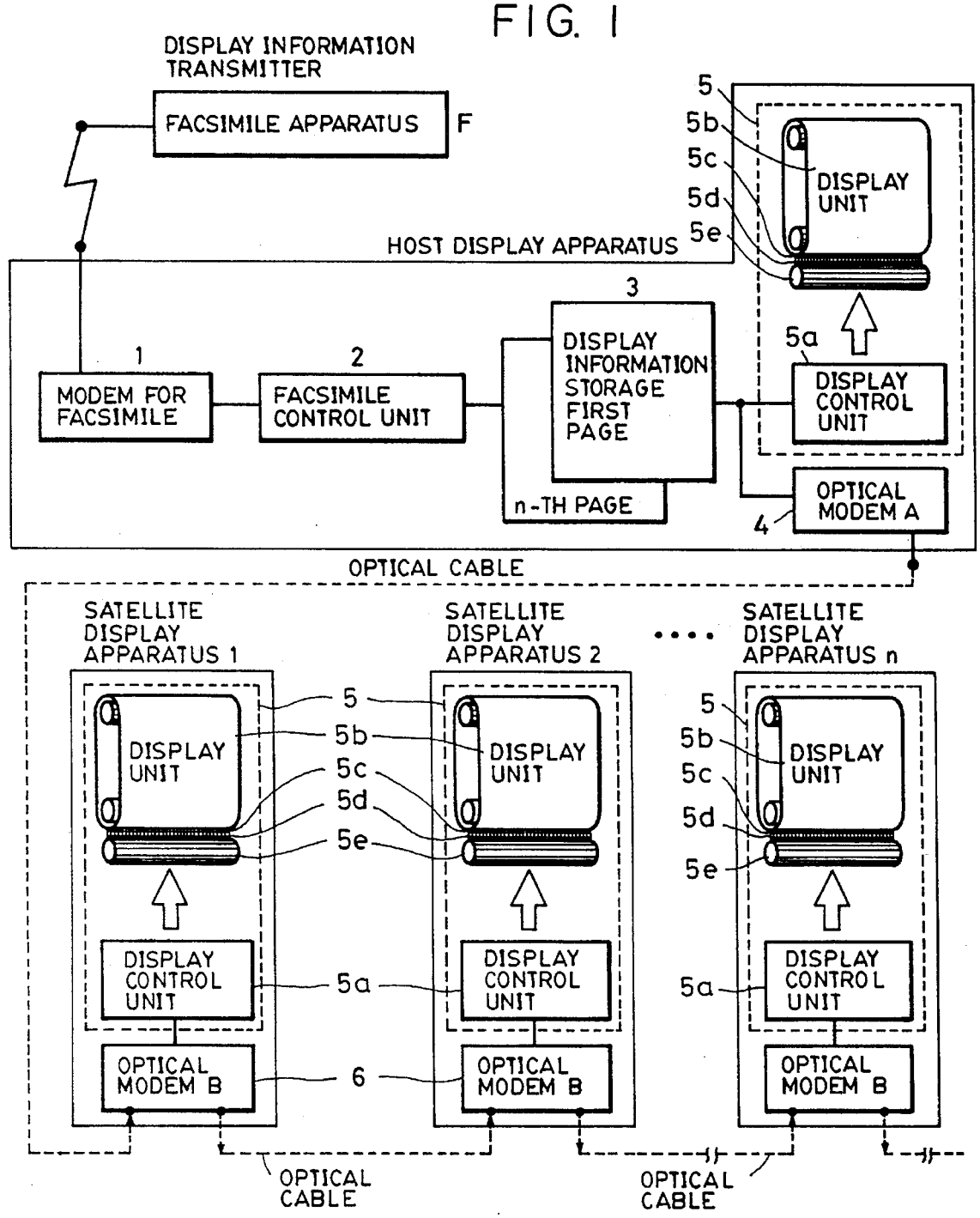
FIG. 1 is a block diagram showing the configuration of an embodiment of the present invention.

FIG. 1 is a block diagram of the embodiment. The host display apparatus includes a modem 1 for facsimile communication, a control unit 2 for controlling operations, such as transmission/reception of facsimile information, input/output of signals in and from a display information storage unit 3, and the like, the display information storage unit 3 comprising a memory for storing display information for a plurality of pages transmitted from the control unit 2, and an optical modem A 4 for controlling display information outputs of the host display apparatus. The display information is transmitted to the satellite display apparatuses by optical cables OC. The optical modem A will be described later.

A display unit 5 which adopts a magnetic-stylus display method has been described in detail, for example, the abovementioned in U.S. patent application Ser. No. 438,009 the disclosure of which is expressly incorporated herein by reference. A display control unit 5a controls the entirety of the display unit 5 in response to display information, a display control command and the like received from the display information storage unit 3. The display unit 5 further includes electrodes 5d for performing a writing operation in the main scanning direction according to a magnetic-stylus recording method, magnetic toner 5c, serving as developing powder, a nonmagnetic sleeve 5e for supplying the magnetic toner, a recording sheet 5b, serving as a visualizing surface, and the like.

Figure 3:
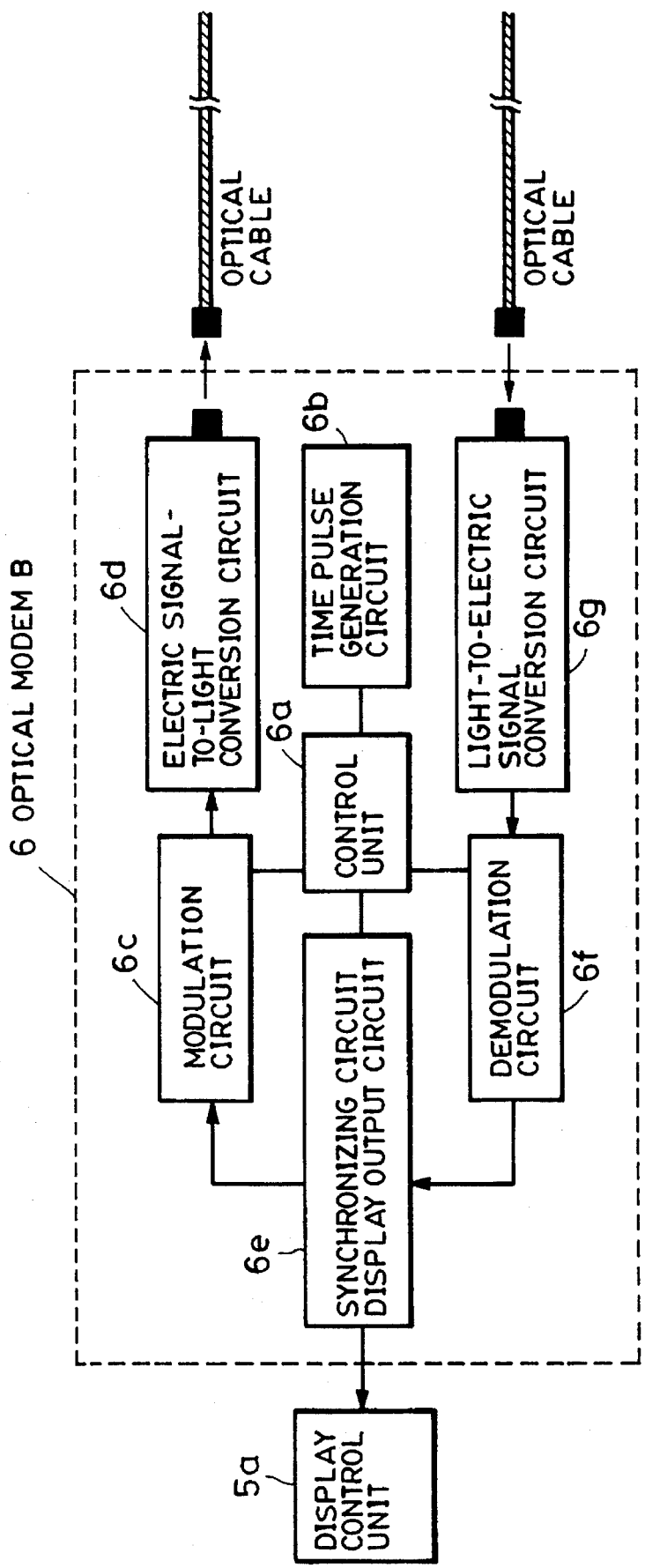
FIG. 3 is a block diagram showing the detail of a modem B shown in FIG. 1.

Each of the satellite display apparatuses includes an optical modem B 6 the detail of which is shown in FIG. 3. Each optical modem B 6 receives display information transmitted from the host display apparatus via the optical cables OC, provides its display control unit 5a with the received display information, and at the same time relays the same display information to the satellite display apparatus in the following stage via the optical cable OC.

Figure 2:
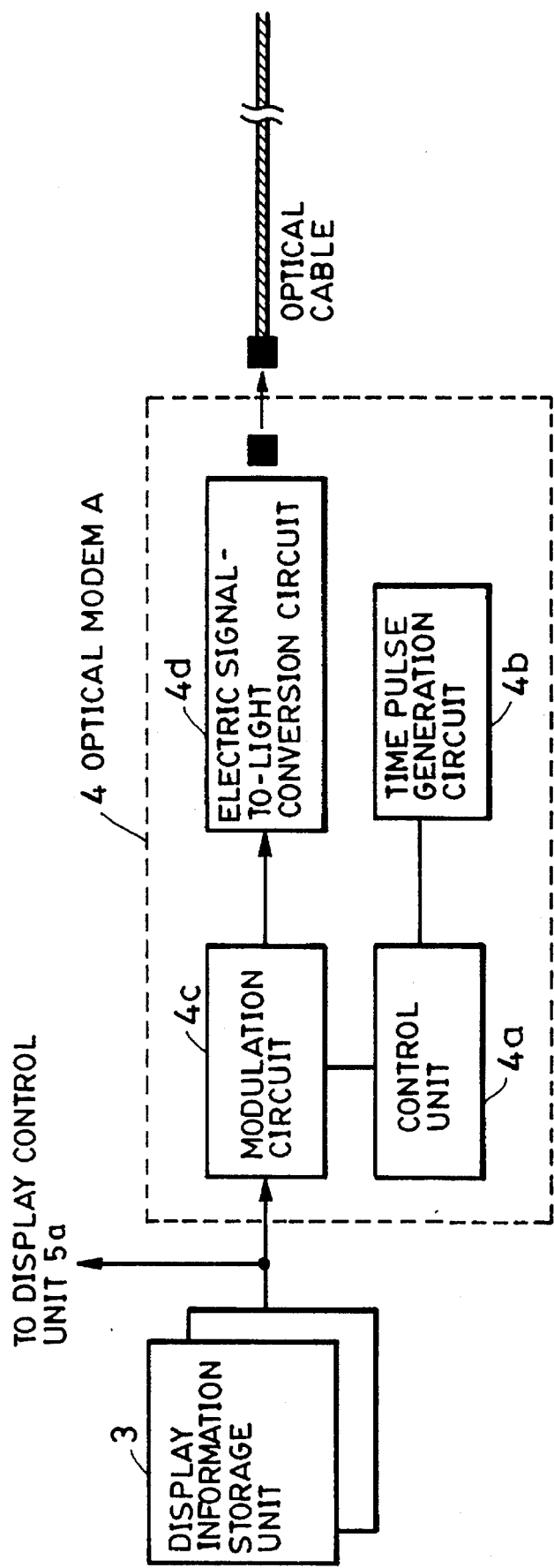
FIG. 2 is a block diagram showing the detail of a modem A shown in FIG. 1.

FIG. 2 is a block diagram of the optical modem A 4 shown in FIG. 1.

The display information received from the display information storage unit 3 is branched into two directions. In one direction, the branched information is transmitted to the display unit control unit 5a of the display unit 5, and in the other direction the branched information is serially input to a modulation circuit 4c. The modulation circuit 4c modulates a signal of each line of the display information with a timing signal indicating the length of write (main) scanning generated by a control unit 4a while synchronizing the signals with a clock pulse generated by a time pulse generation circuit 4b. The modulated signal is converted from an electric signal into an optical signal by an electric signal-to-light conversion circuit 4d. The modulated display information is transmitted to the satellite display apparatuses via the optical cables OC.

FIG. 3 is a block diagram of the optical modem B 6 of the satellite display apparatus shown in FIG. 1.

The modulated display information from the optical cable OC is converted into an electric signal by a light-to-electric signal conversion circuit 6g, and is further input to a demodulation circuit 6f to be demodulated. A control unit 6a detects the leading edge of the timing signal indicating the length of main scanning from the demodulated signal, takes out only a signal corresponding to the display information from signals other than the timing signal within a time period until the timing signal ends, and outputs the taken-out signal to a display output circuit/synchronizing circuit 6e, where the display information is branched into two directions. In one direction, the branched information is tansmitted to the display control unit 5a in order to be displayed on the display unit 5 of the satellite display apparatus. In the other direction the branched informaton is transmitted to a modulation circuit 6c in order to display the same contents on the satellite display apparatus in the following stage. In synchronization with a clock pulse generated by a time pulse generation circuit 6b, the modulation circuit 6c superimposes the clock pulse, the display content signal and the timing signal indicating the period of the main scanning signal with sampling pulses having a higher repetition period than the clock pulse to modulate the information signal. The modulated signal is transmitted to an electric signal-to-light conversion circuit 6d as a serial signal, and the display information is transmitted to the satellite display apparatus in the following stage via the optical cable OC as a digital optical signal.

The operation of each of the satellite display apparatus 1–n is entirely the same. Image data transmitted from a facsimile F of a display information transmitter can be simultaneously displayed on respective display apparatuses installed at remote locations, whereby the display apparatuses can be effectively utilized as bulletin boards, notice boards, display apparatuses for a telephone meeting participated in by a large number of people, a presentation for a television meeting system, and the like.

In the above-described embodiment, the same contents are displayed on respective display apparatuses. However, if the system is arranged such that the information which identifies each display apparatus is transmitted with the display information, and that the display control unit of each display apparatus detects and displays display information for its own apparatus, each display apparatus can display different contents. By transmitting display information in which display information for the transmitting apparatus is removed to the display apparatus in the following stage, more efficient transmission can be performed.

It is also possible to arrange the system such that a two-way telephone line is provided between a host display apparatus and a plurality of satellite display apparatuses, a satellite display apparatus notifies the host display apparatus of its operational state after an operation, such as a display operation or the like, and the host display apparatus notifies a facsimile apparatus or the like of a display information transmitter of the operational state of the all or some of the display apparatuses including the display operation of its own (host) apparatus utilizing the telephone line.

While the present invention has been described with respect to what is presently considered to be the preferred embodiment, it is to be understood that the invention is not limited to the disclosed embodiment. The present invention is intended to cover various modifications and equivalent arrangements included within the spirit and scope of the appended claims.

What is claimed is:

1. A method of displaying the same information on a plurality of display apparatuses, said method comprising the steps of:

connecting a first display apparatus, which is provided with a facsimile communication function, to a second display apparatus not provided with a facsimile communication function and using a line of a type different from a communication line for facsimile reception;

receiving, by said first display apparatus, information via a communication line for facsimile reception;

displaying on said first display apparatus the information received in said receiving step;

automatically transmitting said received information to said second display apparatus from said first display apparatus via said different-type line; and displaying the same information as the information displayed in the displaying step on said second display apparatus substantially simultaneously with the display on said first display apparatus.

2. A method according to claim 1, wherein said different line comprises an optical cable.

3. A method according to claim 1, wherein said second display apparatus transmits information transmitted from said first display apparatus to a third display apparatus via another line of the same type as said different line.

4. A method of displaying the same information on a plurality of display apparatuses, said method comprising the steps of:

receiving, by a first display apparatus provided with a facsimile communication function, information including modulated image information;

demodulating said modulated image information to provide demodulated image information;

displaying said demodulated image information on said first display apparatus;

converting said demodulated image information into an optical signal in synchronization with the display of the image information on said first display apparatus;

automatically transmitting said optical signal to a second display apparatus not provided with a facsimile communication function in a non-facsimile communication;

converting said optical signal transmitted in the transmitting step into an electrical signal; and displaying the demodulated image information on said second display apparatus in accordance with said electric signal converted in the second converting step.

5. A method according to claim 4, wherein said first display apparatus transmits said optical signal to said second display apparatus via an optical cable.

6. A method according to claim 4, further comprising the step of transmitting the optical signal transmitted to said second display apparatus to a third display apparatus.

7. A method according to claim 4, wherein, in each of said displaying steps, an image is formed on a recording medium, and the image formed on the recording medium is displayed on a display unit.

8. A display method in a plurality of display apparatuses, said method comprising the steps of:

receiving, by facsimile communication, image information and identifying information for identifying on which of said plurality of display apparatuses said image information is to be displayed by a first display apparatus provided with a facsimile communication function;

judging whether the received image information is to be displayed on said first display apparatus or not on the basis of the received identifying information;

displaying the received image information on said first display apparatus if a result of judging is to display the received image information and converting the received image information and identifying information into an optical signal and transmitting the optical signal to a second display apparatus without displaying the received image information on said first displaying apparatus if the result of judging is not to display the received image information.

* * * * *

UNITED STATES PATENT AND TRADEMARK OFFICE
CERTIFICATE OF CORRECTION

PATENT NO. : 5,574,574

DATED : November 12, 1997

INVENTOR(S) : Koichi Kawamura

It is certified that error appears in the above-identified patent and that said Letters Patent is hereby corrected as shown below:

COLUMN 4
  Line 48, "different" should read --different-type--.
  Line 53, "different" should read --different-type--.

COLUMN 6
  Line 12, "information and" should read --information; and--.
  Line 18, "displaying should read --display--.

Signed and Sealed this

Twenty-ninth Day of April, 1997

Attest:

BRUCE LEHMAN

Attesting Officer     Commissioner of Patents and Trademarks